United States Patent [19]

Olper et al.

[11] Patent Number: 4,927,510
[45] Date of Patent: May 22, 1990

[54] HYDROMETALLURGICAL PROCESS FOR RECOVERING IN PURE METAL FORM ALL THE LEAD CONTAINED IN THE ACTIVE MASS OF EXHAUSTED BATTERIES

[75] Inventors: Marco Olper, Monza; Pierluigi Fracchia, Milan, both of Italy

[73] Assignee: Engitec Impianti S.p.A., Italy

[21] Appl. No.: 258,596

[22] Filed: Oct. 17, 1988

[30] Foreign Application Priority Data

Oct. 20, 1987 [IT] Italy ................ 22348 A/87

[51] Int. Cl.$^5$ ................ C25C 1/18
[52] U.S. Cl. .................. 204/114; 204/115; 204/117; 75/120; 429/49; 423/95; 423/559
[58] Field of Search ........ 204/115, 117, 114; 75/120; 429/49; 423/95, 559

[56] References Cited

U.S. PATENT DOCUMENTS

| | | | |
|---|---|---|---|
| 1,148,062 | 7/1915 | Tucker | 423/98 |
| 1,752,356 | 4/1930 | Smith | 204/116 |
| 1,911,604 | 5/1933 | Calbeck | 204/114 |
| 3,395,010 | 7/1968 | Shoeld | 75/10.59 |
| 4,024,055 | 5/1977 | Blann | 210/712 |
| 4,107,007 | 8/1978 | Gaumann et al. | 204/116 |
| 4,118,219 | 10/1978 | Elmore et al. | 75/103 |
| 4,229,271 | 10/1980 | Prengaman et al. | 204/114 |
| 4,269,810 | 5/1981 | Kolakowski | 423/92 |
| 4,460,442 | 7/1984 | Ducati | 204/114 |

FOREIGN PATENT DOCUMENTS 2590277 5/1987 France .
2073725 10/1981 United Kingdom .

OTHER PUBLICATIONS

U.S. Pat. No. 1,148,062-Method of Utilizing Battery Waste-Clarence E. Tucker (Claims of patent only).
U.S. Bureau of Mines, Report of Investigations, No. 8857, 1984; A. Y. Lee et al.; Electrolytic Method for Recovery of Lead from Scrap Batteries, Scale-Up Study Using 20-Liter Multi-Electrode Cell.

Primary Examiner—John F. Niebling
Assistant Examiner—David G. Ryser
Attorney, Agent, or Firm—Roylance, Abrams, Berdo & Goodman

[57] ABSTRACT

A process for recovering in pure metal form substantially all lead from battery sludge is disclosed. The battery sludge is desulfurized, leached with acid, and separated by filtration. Lead is recovered from the filtrate by electrowinning. The residue from the leaching and filtration is treated with concentrated sulfuric acid to cause the simultaneous occurring of the following reactions:

$$C_n(H_2O)_m + H_2SO_4 \rightarrow nC + H_2SO_4 \cdot mH_2O \quad (1)$$

$$C + 2PbO_2 + 2H_2SO_4 \rightarrow 2PbSO_4 + CO_2 + 2H_2O \quad (2)$$

up to the quantitative reduction of substantially all of the lead dioxide $PbO_2$ and elimination of substantially all the organic substances $C_n(H_2O)_m$ contained in the insoluble residue. Lead sulfate from the above reaction is recycled to the desulfurization step.

5 Claims, 1 Drawing Sheet

U.S. Patent May 22, 1990 4,927,510
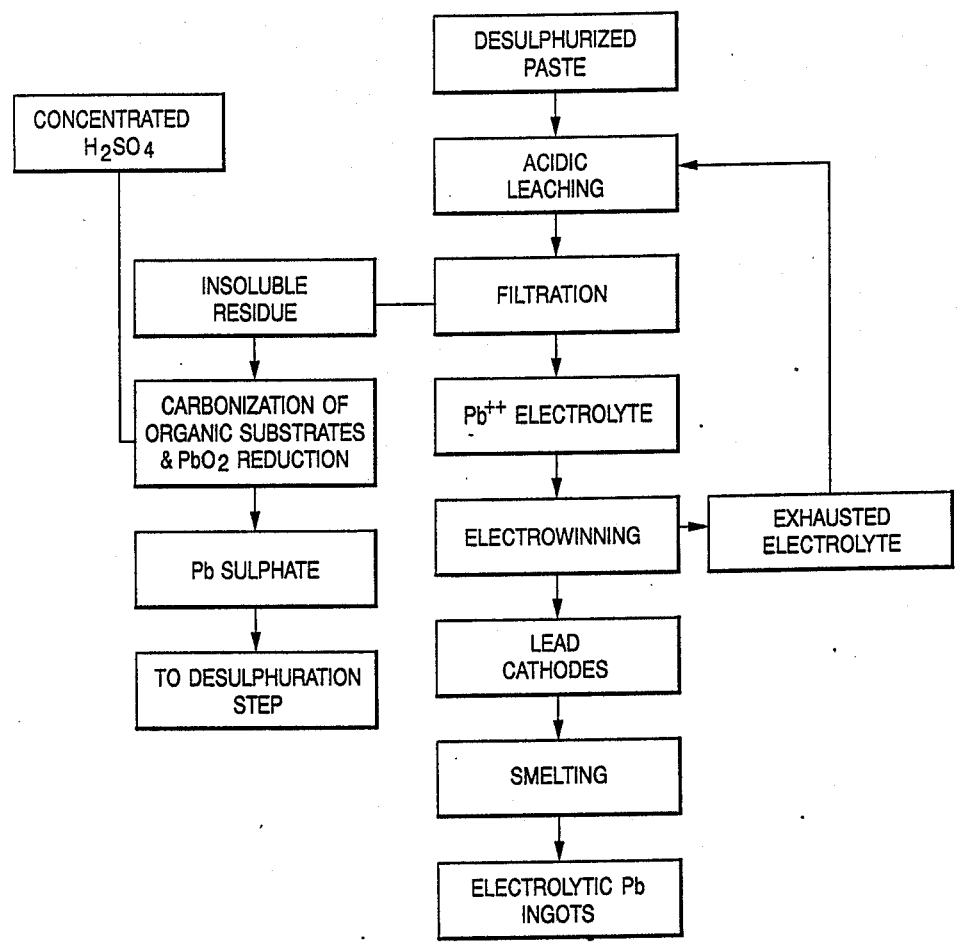

HYDROMETALLURGICAL PROCESS FOR RECOVERING IN PURE METAL FORM ALL THE LEAD CONTAINED IN THE ACTIVE MASS OF EXHAUSTED BATTERIES

FIELD OF THE INVENTION

This invention relates to a hydrometallurgical process for recovering in pure metal form substantially all lead from battery sludge. In particular, this invention relates to a process for treating the insoluble residue that remains after battery sludge has been desulfurized, leached with acid suitable for electrowinning, and separated by press-filtration.

BACKGROUND OF THE INVENTION

Various processes known in the prior art for obtaining lead from the sludge of exhausted batteries begin with the step of desulfurizing the sludge by treating it with solutions of alkali-metal or ammonium carbonate. In this treatment, practically all sulfur contained in the battery sludge passes into solution in the form of soluble alkali-metal sulfate or ammonium sulfate, and a desulfurized paste, also called the "active mass", containing a mixture of insoluble lead compounds is obtained.

Currently, pyrometallurgical reduction is the most widely used method for extracting lead from desulfurized paste. However, pyrometallurgical processes have the disadvantage that special precautions must be taken in handling lead-containing materials in a furnace to avoid spreading lead fumes and dust. Extensive filtration facilities and monitoring equipment are required to detect harmful lead contaminants and to avoid spreading them in the workplace and environment. Moreover, pyrometallurgical processing produces a slag that is, due to environmental concerns, expensive to dispose of.

Hydrometallurgical processes, such as electrowinning, constitute a valuable alternative to pyrometallurgical processes by avoiding many of the problems of pollution described above. However, with electrowinning of lead compounds there arises the problem that lead dioxide ($PbO_2$), a major component of the desulfurized paste of battery sludge, is insoluble in the normal acids suitable for electrowinning. Electrowinning without converting lead dioxide into a soluble compound produces a low yield and leaves a toxic, lead-containing residue.

A variety of techniques for the solubilization of lead compounds of an active mass are taught in the prior art as shown by the following patents:

C. E. Tucker in U.S. Pat. No. 1,148,062 discloses heating of the battery sludge in order to transform $PbO_2$ into soluble $PbO$ and $Pb_2O$.

W. C. Smith in U.S. Pat. No. 1,752,356, in order to solubilize $PbO_2$ before the attack with caustic alkali, treats the whole active mass by a heating step under a reducing atmosphere ($PbO$ is formed).

J. H. Calbeck in U.S. Pat. No. 1,911,604 provides for the active mass of the battery to be leached by a solution of sodium acetate. Pb oxide and sulfate are dissolved, while $PbO_2$ is normally insoluble in that electrolyte. But, in the presence of metal Pb and in the said electrolyte, a local couple is established, so that $PbO_2$ and an equivalent amount of metal Pb should be dissolved.

A. F. Gaumann in U.S. Pat. No. 4,107,007 leaches the active mass with a concentrated solution of an alkali-metal hydroxide, to which molasses, or raw sugar, or similar products, has been previously added. In such way, Pb oxide and Pb sulfate are dissolved, and are sent to the electrolysis. The behavior of $PbO_2$ is not detailed.

M. E. Elmore in U.S. Pat. No. 4,118,219, in order to reduce $PbO_2$, mentions the use of some reducing agents, such as formaldehyde, $H_2O_2$, metal Pb, or calcination.

R. D. Prengaman in U.S. Pat. No. 4,229,271 proposes two routes for eliminating $PbO_2$ from the active mass, and rendering it wholly soluble in the usual acids for the electrowinning process:

(a) a drying at 100° C. of the active mass, followed by a roasting under a reducing atmosphere at temperatures comprised within the range of from 290° to 325° C.;

(b) a treatment of the aqueous suspension of the active mass with sulfur dioxide, or with alkali-metal or ammonium sulfite or bisulfite.

U. Ducati in U.S. Pat. No. 4,460,442 makes the active mass of the battery react at 100°–120° C. in the presence of a strongly alkaline solution, in order to obtain a precipitate of minium, which should display the property of getting completely dissolved in the hot concentrated solutions of fluoboric and fluosilicic acid.

A. Y. Lee and E. R. Cole of Bureau of Mines in R.I. 8857 suggest two ways for reducing $PbO_2$ contained in the active mass:

(a) by means of the addition of Pb powder during the leaching with fluosilicic acid of past already desulfurized by reaction with ammonium carbonate;

(b) by means of the addition of ammonium bisulfite during the treatment of desulfurization with ammonium carbonate.

The suggested methods of high-temperature reduction of $PbO_2$ under a reducing atmosphere show the disadvantage that they add two steps to the processing cycle: the drying, and the reducing roasting. These processing steps require a strict control of the operating conditions, and furthermore must be carried out inside a unit (the furnace, or the roaster) provided with an adequate dust removal facility. Furthermore, even with low temperatures, the handling of a dry material may cause environmental pollution.

The method of reduction during acidic attack, by means of the addition of lead powder, implicitly requires the transfer of a portion of the produced lead to produce the powder from it; it is therefore expensive, not only due to the recycling of lead, but also due to a low reaction speed at temperatures close to ambient temperature.

The method of reduction with sulfur dioxide, sulfite or bisulfite before the carbonation step involves great expense due to the excess amount of reactant that must be added and increases the amount of carbonate required for the desulfurization by approximately 25%. The reaction is slow and the yield of $PbO_2$ reduction is generally not total.

In general, all these systems known from the prior art suffer from the serious problem that they do not secure a total dissolving of the lead contained in the active mass of the batteries.

The failure using methods known in the prior art to achieve a substantially total recovery of the lead contained in battery sludge could be caused in part by the presence of the organic substances in the desulfurized paste. The organic substances include substances introduced during the manufacture of the batteries and substances such as fragments of separators, wood, fibers, and paper that get concentrated in the active mass during the crushing and processing of exhausted batteries. Inasmuch as most of these organic substances have a structure of cellulose type, and are very porous, they retain lead compounds, prevent them from being completely dissolved, eventually lowering the yield of the recovery process.

Accordingly, there exists a need for a hydrometallurgical process for recovering substantially all the lead from battery sludge that avoids the problems of pollution and expense of pollution control associated with pyrometallurgical processes and avoids the problems of inefficiency associated with known hydrometallurgical processes.

SUMMARY OF THE INVENTION

Accordingly, a primary object of this invention is to provide a hydrometallurgical method for recovering in pure metal form substantially all the lead contained in battery sludge.

A further object of the invention is to provide a method for reducing lead dioxide that further allows the removal of organic substances.

A further object of the invention is to provide a hydrometallurgical method of recovering lead from battery sludge using an electrolyte that can be recycled.

A further object of the invention is to provide a method of reducing lead dioxide that uses a low cost reactant that is easily found on the market.

A further object of the present invention is to provide a method of reducing lead dioxide wherein the end of the reduction can be monitored by means of a color change, so that the reactant used can be accurately metered, thereby avoiding waste.

A further object of the present invention is to provide a method of reducing lead dioxide without the necessity of supplying heat.

A further object of the present invention is to provide a method of reducing lead dioxide and carbonizing organic matter that can be carried out inside Fe equipment.

A further object of the present invention is to provide a method for recovering lead from battery sludge wherein any residue from the process is continuously recycled and wherein solid effluents are not produced.

The foregoing objects are basically attained by providing a process for recovering in pure metal form substantially all lead from battery sludge containing lead compounds including lead dioxide and lead sulfate and containing organic substances of the form $C_n(H_2O)_m$ comprising the steps of:
(a) desulfurizing battery sludge to form a desulfurized paste;
(b) leaching the desulfurized paste with an aqueous solution of an acid selected from the acids suitable for electrowinning to form a liquid/solid mixture;
(c) separating the liquid/solid mixture by press-filtering and washing to form a filtrate containing $Pb^{++}$ ions and an insoluble residue consisting essentially of lead dioxide organic substances and moisture;
(d) treating the filtrate by electrowinning to produce lead in pure metal form thereby creating an exhausted electrolyte;
(e) treating the insoluble residue formed in step (c) with concentrated sulfuric acid sufficient to cause the simultaneous occurring of the following reactions:

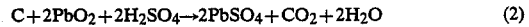

up to the quantitative reduction of substantially all of the lead dioxide $PbO_2$ and elimination of substantially all the organic substances $C_n(H_2O)_m$ contained in the insoluble residue; and
(f) feeding the so-treated insoluble residue to the desulfurizing of step (a).

Other objects, advantages and salient features of the invention will become apparent from the following detailed description, which, taken in conjunction with the block diagram depicted in the hereto attached drawing, discloses the preferred embodiment of the invention.

BRIEF DESCRIPTION OF THE DRAWING

Referring now to the drawing that forms part of this original disclosure, the drawing is a block diagram showing the process of the present invention.

DETAILED DESCRIPTION OF THE PREFERRED EMBODIMENT

In accordance with the practice of this invention, battery sludge from an exhausted battery is first separated from other components of the exhausted battery and is desulfurized by methods known in the art, for instance, by treating the battery sludge with a solution of alkali metal or ammonium carbonate, creating a desulfurized paste, also sometimes called an active mass.

The desulfurized paste has, in the average, the following lead composition:

| | |
|---|---|
| lead carbonate ($PbCO_3$) | 45–55% |
| lead sulfate ($PbSO_4$) | 2.5–4% |
| lead dioxide ($PbO_2$) | 15–25% |
| lead oxide ($PbO$) | 0–5% |
| metal lead ($Pb$) | 3–7% |
| organic substances | 3–5% |

The desulfurized paste is leached with the aqueous solution of an acid suitable for the subsequent electrowinning, preferably either fluoboric or fluosilicic acid. In this step, the reactions occur:

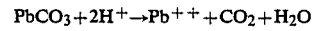

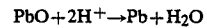

The acidic leaching results in a liquid/solid mixture, the liquid comprising an electrolyte and $Pb^{++}$ ions.

The reaction is complete in less than one hour at the temperature of the electrolyte (30°–50° C.).

After the acidic leaching of the desulfurized paste, only organic substances (thin pieces of separators and ebonite, fibers, glues, carbon black, wood, paper, and so forth), generally indicated by the formula $C_n(H_2O)_m$, and lead dioxide $PbO_2$, remain undissolved in the liquid/solid mixture as a solid residue.

The liquid/solid mixture produced by the leaching is separated by press-filtration, with a thorough washing to remove all the electrolyte from the insoluble residue. The insoluble residue from the filtration - viz., the filtration panel generally represents 25–30% of the leached material, and contains approximately 20% of the lead present in the raw material.

To the insoluble residue coming from the filtration, concentrated $H_2SO_4$ is then added, with the simultaneous occurring of the two above defined (1) and (2) reactions.

The ratio of organic substances $C_n(H_2)_m$/lead dioxide $PbO_2$ is generally such as to secure the quantitative reduction of all of lead dioxide present and the elimination of carbonaceous residues.

The moisture content of the insoluble residue after the filtration is an important aspect, because it controls the reaction of carbonization of the organic substances with concentrated sulfuric acid. A moisture level within the range of from 10 to 15% is the optimum for the reaction to take place completely, and with a controlled course. The amount of $H_2SO_4$ to be added to the filtration panel is approximately equal to the stoichiometric amount necessary to block all contained $Pb^{++}$ as $PbSO_4$.

The reaction is fast, and takes place in paste phase; within a few minutes, the whole brown-red mass of the insoluble residue turns gray, indicating that the reaction is complete. Surprisingly, elemental carbon formed in reaction (1) is thought to be capable of activating reaction (2). The so-obtained material is recycled to the desulfurization step, and the cycle begins again.

The filtrate solution contains Pb entirely in ionic form, and does not normally require any purifications, because it is the same Pb powder present in the desulfurized paste, which carries out the action of displacement (also said "cementation") of the metal impurities (essentially Sb and Cu), small amounts of which may have gone in solution during the acidic attack.

The self-purified solution of $Pb^{++}$ electrolyte can be then directly sent to the electrolytic extraction, or electrowinning, of lead, which takes place inside cells suitable for the electrolysis, having insoluble anodes and cathodes consisting of thin lead or stainless-steel sheets, such as are known in the art.

By operating under suitable conditions, a cathodic deposit endowed with excellent characteristics of quality and purity can be obtained, with the deposition of $PbO_2$ on the anode being completely avoided.

The cathodes are smelted to form ingots, which are marketed as electrolytic lead.

The electrolyte deprived of lead in the electrolysis step is used to leach desulfurized paste or to leach the product coming from the desulfurization step.

EXAMPLE 980 g of desulfurized, well-washed paste, containing, by dry weight, 70.5% of Pb, 0.68% of Sb and 0.48% of S, was leached with 5 liters of exhausted electrolyte from electrowinning, containing:
49 g/l of $Pb^{++}$
139 g/l of free $HBF_4$.

After a 1 hour stirring at 50° C., by filtration: 330 g of an insoluble washed residue having the composition:
$H_2O$ 12%
Pb 51.6%
S 1.4%
and 4.95 liters of a lead-containing electrolyte, containing
152.5 g/l of Pb
1.1 g/l of Sb
51 g/l of free $HBF_4$
were separated.

The leaching with fluoboric acid enabled 75% of total Pb contained in the paste to be extracted.

The 330 g insoluble residue was treated with 82 g of concentrated $H_2SO_4$, the mixture was stirred for 10 minutes up to an earth consistency, and a gray end product was obtained, which was substantially constituted by lead sulfate.

By recycling this material to the steps of carbonation (desulfurization) and leaching with the exhausted electrolyte, a further 146 g of Pb was extracted.

With this sequence of operations, from 980 g of initial paste, 663.5 g of lead in fluoboric solution was therefore obtained (extraction yield 96%).

By recycling the gray lead sulfate-containing end product to the carbonation (desulfurization) step, and leaching it with 1.5 liters of an exhausted electrolyte having the above shown composition, an end residue of 54 g, having the following composition:
$H_2O$ 13.5%
Pb 43.2%
S 3.90%
and
1.48 liters of an electrolyte containing:
148 g/l of Pb
55 g/l of free $HBF_4$
were obtained.

The overall amount of electrolyte obtained is: 6.43 liters, containing:
151.5 g/l of $Pb^{++}$
51.9 g/l of free $HBF_4$.

By processing this electrolyte, to which the usual deposit leveling off agents were previously added by electrowinning in an electrolytic cell having insoluble anodes and cathodes made of thin sheets of electrolytic lead, 660 g was produced of cathodic lead. No $PbO_2$ was formed at the anode.

The cell was run 24 hours long at 7.4 A and 2.9 V.
The cathodic current density was of 300 $A/m^2$.
The current yield was of 96.2%.

The exhausted electrolyte to be recycled to the chemical attack of fresh paste contained:
49.5 g/l of Pb
138.2 g/l of free $HBF_4$.

While one example has been chosen to illustrate the invention, it will be understood by those skilled in the art that various changes and modifications can be made therein without departing from the scope of the invention as defined in the appended claims.

We claim:

1. A process for recovering in pure metal form substantially all lead from battery sludge containing lead compounds including lead dioxide and lead sulfate and containing organic substances of the form $C_n(H_2O)_m$ comprising the steps of:
    (a) desulfurizing battery sludge to form a desulfurized paste;
    (b) leaching said desulfurized paste with an aqueous solution of an acid selected from the acids suitable for electrowinning to form a liquid/solid mixture;
    (c) separating said liquid/solid mixture by press-filtering and washing to form a filtrate containing $Pb^{++}$ ions and an insoluble residue consisting essentially of lead dioxide organic substances and moisture;
    (d) treating said filtrate by electrowinning to produce lead in pure metal form and an exhausted electrolyte;
    (e) treating said insoluble residue formed in step (c) with concentrated sulfuric acid sufficient to cause the simultaneous occurring of the following reactions:

$$C_n(H_2O)_m + H_2SO_4 \rightarrow nC + H_2SO_4 \cdot mH_2O \quad (1)$$

$$C + 2PbO_2 + 2H_2SO_4 \rightarrow 2PbSO_4 + CO_2 + 2H_2O \quad (2)$$

up to the quantitative reduction of substantially all of the lead dioxide $PbO_2$ and elimination of substantially all the organic substances $C_n(H_2O)_m$ contained in said insoluble residue; and (f) feeding the so-treated insoluble residue to the desulfurizing of step (a).

2. The process of claim 1, characterized in that said reaction (2) according to step (e) is activated by the carbon that is developed in said reaction (1) according to step (e).

3. The process of claim 1, wherein said insoluble residue of steps (c) and (e) has a moisture level of between about 10% and about 15%.

4. The process of claim 1 wherein the amount of concentrated sulfuric acid used in step (e) is the stoichiometric amount sufficient to cause the reaction according to reaction (2) of step (e) of substantially all lead dioxide present in said insoluble residue.

5. The process of claim 1 further comprising the step of:

(g) recycling said exhausted electrolyte of step (d) into said aqueous solution of step (b).

* * * * *